(12) United States Patent
Jongsma

(10) Patent No.: US 11,824,582 B2
(45) Date of Patent: Nov. 21, 2023

(54) UNDERWATER OPTICAL COMMUNICATION UNIT

(71) Applicant: FNV IP B.V., Leidschendam (NL)

(72) Inventor: Arnoud Marc Jongsma, Leidschendam (NL)

(73) Assignee: FNV IP B.V., Leidschendam (NL)

(*) Notice: Subject to any disclaimer, the term of this patent is extended or adjusted under 35 U.S.C. 154(b) by 21 days.

(21) Appl. No.: 17/783,027

(22) PCT Filed: Dec. 7, 2020

(86) PCT No.: PCT/NL2020/050764
§ 371 (c)(1),
(2) Date: Jun. 7, 2022

(87) PCT Pub. No.: WO2021/118345
PCT Pub. Date: Jun. 17, 2021

(65) Prior Publication Data
US 2023/0006740 A1    Jan. 5, 2023

(30) Foreign Application Priority Data

Dec. 9, 2019 (NL) .................................... 2024411

(51) Int. Cl.
*H04B 10/00* (2013.01)
*H04B 10/112* (2013.01)
(Continued)

(52) U.S. Cl.
CPC ......... *H04B 10/1123* (2013.01); *H04B 10/80* (2013.01)

(58) Field of Classification Search
CPC .................................................... H04B 10/80
See application file for complete search history.

(56) References Cited

U.S. PATENT DOCUMENTS

| 7,953,326 B2 | 5/2011 | Farr et al. |
| 8,953,944 B2 | 2/2015 | Machado et al. |
| (Continued) | | |

FOREIGN PATENT DOCUMENTS

| CN | 108063639 A | 5/2018 |
| RU | 2526207 C2 | 8/2014 |
| WO | 2019013628 A2 | 1/2019 |

OTHER PUBLICATIONS

Pratap Bhanu S0lanki et al: "Extended Kalman Filter-Based Active Alignment Control for LED 0ptical Communication", IEEE / ASME Transacti0ns 0n Mechatronics., vol. 23, No. 4, Aug. 1, 2018 (Aug. 1, 2018), pp. 1501-1511, XP055722139, US, ISSN: 1083-4435, D0I: 10.1109/TMECH.2018.2841643 figure 1 I. Introduction, A. System Components.
(Continued)

*Primary Examiner* — Daniel G Dobson
(74) *Attorney, Agent, or Firm* — Polsinelli PC

(57) ABSTRACT

A communication unit (20) configured for wireless optical communication underwater, and including a communication transceiver (24), a housing (22), an adjustment mechanism (28), and a processor (40). The transceiver is accommodated in the housing, and includes a signal detector configured to receive an optical communication signal (50) approaching the unit within a main detection lobe centred on a receiver directivity axis (Ar), and/or includes a signal generator configured to emit an optical communication signal (52) via a main emission lobe centred on a transmitter directivity axis (At). The adjustment mechanism is configured to adjust orientation(s) of the receiver and/or transmitter directivity axes relative to the housing. The processor is configured to determine a directional coordinate ($\Phi i$, $\Theta i$) for an approaching light signal (50, 54), and to control the adjustment mechanism to automatically adjust and align the orientation
(Continued)

of the directivity axes with the determined directional coordinate.

15 Claims, 6 Drawing Sheets

(51) Int. Cl.
  *H04B 10/80* (2013.01)
  *H04J 14/00* (2006.01)

(56) References Cited

U.S. PATENT DOCUMENTS

| | | | |
|---|---|---|---|
| 9,231,708 B2 | 1/2016 | Farr et al. | |
| 9,294,201 B2 | 3/2016 | Farr et al. | |
| 9,715,611 B2 | 7/2017 | Li et al. | |
| 11,044,021 B1 * | 6/2021 | Jim | H04B 10/80 |
| 2016/0127042 A1 | 5/2016 | Farr et al. | |

OTHER PUBLICATIONS

R. Ramirez-Iniguez et al: "Optical antenna design for indoor optical wireless communication systems", International Journal of Communication Systems., vol. 18, No. 3, Apr. 1, 2005 (Apr. 1, 2005), pp. 229-245, XP055722344, GB ISSN: 1074-5351, DOI: 10.1002/dac.701 the whole document.

J. George et al: "Application of fan-beam antennas for 60 GHz indoor wireless communication", Electoonics Etters, vol. 37, No. 2, Jan. 1, 2001 (Jan. 1, 2001), p. 73, XP055722312, GB ISSN: 0013-5194, DOI: 10.1049/el:20010059 the whole document.

Fahs Bassem et al: "A Self-Alignment System for LOS Optical Wireless Communication Links", IEEE Photonics Technology Letters, IEEE Service Center, Piscataway, NJ, US, vol. 29, No. 24, Dec. 15, 2017 (Dec. 15, 2017), pp. 2207-2210, XP011673205, ISSN: 1041-1135, DOI: 10.1109/LPT.2017.2771303 [retrieved on Nov. 16, 2017] figure 1(c).

Liu Fulin et al: "a simple and effective tracking scheme for visible light communication systems", Microfluidics, Biomems, and Medical Microsystems XI : Feb. 3-5, 2013, San Francisco, California, United States ; [Part of SPIE Photonics West]; In: Proceedings of SPIE; ISSN 0277-786X; vol. 8615; [Proceedings of SPIE; ISSN 0277-786X; vol. 8615],, vol. 11048, Feb. 14, 2019 (Feb. 14, 2019), pp. 110481H-110481H, XP060115952, DOI: 10.1117/12.2521930 ISBN: 978-1-5106-2099-5 the whole document.

* cited by examiner

UNDERWATER OPTICAL COMMUNICATION UNIT

TECHNICAL FIELD

The invention relates to an underwater wireless optical communication unit, and to a method for using such a unit.

BACKGROUND ART

In many underwater applications, for instance in subsea ecological monitoring, geology, oil and gas extraction, and defence applications, there is an increasing need for communicating data between two submerged entities. Communication technologies that rely on light propagating freely through the water provide high data rates and allow exchange of data between arbitrary pairs of transmitting and receiving devices (e.g. underwater monitoring units, nearby underwater vehicles, or other artificial underwater structures). The small carrier wavelengths for optical data signals allows construction of small units and communication components with high resolution (e.g. a factor 10,000 compared to acoustic communication), low latency, and fast update rates.

Propagation of light underwater is nevertheless severely limited compared to propagation in air or free space. For wireless communication transmission underwater, it is preferred to use optical signals with wavelengths ranging from 300 nanometres to 600 nanometres, to anticipate for the selective propagation behaviour of light through water resulting from absorption and scattering by the water and/or particulates in the water.

The maximum communication signal distance between an optical transmitter and receiver in an optical underwater communication system that can be bridged depends on available optical power, communication bandwidth, sensitivity of the receiver, directivity of the receiver and transmitter, and attenuation of the electromagnetic field along the propagation path. For any optical communication system, the required power is proportional to the data rate, but the gain of the system is inversely proportional to the required power.

It may be advantageous to use a directional communication system with high directivity in order to increase maximum communication range and data rate, and/or to improve power-to-range efficiency. The latter may be particularly desired in self-powered subsea communication devices, which may be designed to function autonomously underwater for a prolonged time to minimize deployment, calibration, and retrieval operations.

In any case, the transmitter and/or receiver in directional systems need to be properly pointed and mutually aligned with a receiver and/or transmitter of another system, to establish a signal link. A small error in alignment of a transmitter of one unit and a receiver of another unit may mean that only a weak signal or even no signal will be received at the other unit. The correct pointing angles may be found by scanning the surroundings and searching for reception maxima with the transmitting and/or receiving units, but this requires considerable time, especially for highly directive transmitting and/or receiving units.

It would be desirable to provide an underwater wireless communication unit that allows rapid autonomous establishment of a high-bandwidth and/or high-range communication link with a nearby unit, vehicle, or structure.

SUMMARY OF INVENTION

Therefore, according to a first aspect of the invention, there is provided a communication unit for wireless optical communication in an underwater environment. The unit comprises a housing, a communication transceiver, an adjustment mechanism, and a processor device. The housing accommodates the communication transceiver. The communication transceiver includes an optical signal detector that has a directive gain with a main lobe centred on a receiver directivity axis, and is configured to receive an optical communication signal approaching the unit through the main lobe. Alternatively or in addition, the communication transceiver includes an optical signal generator that has a directive gain with a main lobe centred on a transmitter directivity axis, and is configured to emit an optical communication signal along the transmitter directivity axis and away from the unit. The adjustment mechanism is configured to adjust an orientation of the receiver directivity axis and/or an orientation of the transmitter directivity axis relative to the housing. The processor device is configured to determine at least one directional coordinate (e.g. azimuth and/or elevation angle) for a light signal approaching the communication unit from a light source located in the vicinity. The processor device is further configured to control the adjustment mechanism to automatically adjust and align the orientation of the receiver directivity axis with the determined at least one directional coordinate. Alternatively or in addition, the processor device is configured to control the adjustment mechanism to automatically adjust and align the orientation of the transmitter directivity axis with the at least one directional coordinate.

The unit may include an optical communication transmitter and/or an optical communication receiver that are/is directional and repositionable relative to a stationary part of the housing. The processor device is configured to determine one or more directional coordinates of the received light signal, based on data acquired by another measurement source, for instance data from an on-board photogrammetric camera. Based on the determined coordinate(s), the optical communication receiver and/or transmitter can be realigned automatically, without wasting time and energy on scanning the surroundings for incoming signals with the directional receiver, or wasting power on optical transmissions towards directions where the recipient is not located. A communication link between the unit and the target can thus be quickly established or recovered after a link failure.

The directivities of the optical signal generator and detector represent the maximal values of their respective directive radiation or detection gain functions. The directive gain is a ratio of the power per unit solid angle radiated/received in a particular direction to the average power value over all directions. An optical transmitter and/or receiver with a directivity D of 10 ($D_{dB}=10$ dB relative to an isotropic reference radiator $D_i=1$) or more may yield significant improvements in underwater communication channel performance. Transceiver and/or receiver directivities of 30 ($D_{dB}\approx15$ dB), 300 ($D_{dB}\approx25$ dB), or even 3000 ($D_{dB}\approx35$ dB) may be preferred.

In embodiments wherein the communication receiver and transmitter are both directional and repositionable, the optical signal generator and detector may be mechanically fixed to each other, and integrated to form one repositionable transceiver unit. This allows the use of a single actuator device for simultaneously repositioning the transmitter and receiver main lobes with the directional coordinate(s). Alternatively, the optical signal generator and detector, as well as their adjustment mechanisms, may be formed as distinct devices that are accommodated in distinct housings and which are independently repositionable. This allows the main lobes of the directional transmitter and receiver to be aligned with different targets (e.g. to relay received signals from a nearby underwater vehicle to another communication unit, or vice versa).

In embodiments, the communication unit comprises an underwater imaging device, configured to acquire image data of the light signal. The processor device may then be configured to receive the image data from the imaging device, to determine the directional coordinate(s) for the light signal relative to the imaging device, and to control the adjustment mechanism to automatically adjust and align the orientation of the respective directivity axis with the at least one directional coordinate.

The imaging device and position detection capability allow imaging of a light emitting target in the vicinity, and determination of directional coordinate(s) for the target (e.g. azimuth and/or elevation angle, or direction cosines). The underwater imaging device may be formed by an omnidirectional photogrammetric camera with an ultra-wide field of view (UW-FOV), preferably with an azimuthal coverage of 360° and an elevational coverage of at least −20° to +30°, for instance of −20° to 90°, or even of −50° to 90°.

In embodiments, the housing extends along a nominal unit axis. The unit may comprise an optical system that defines a focal plane substantially parallel with the unit axis, such that the optical signal detector and/or generator of the communication transceiver is located in the focal plane, and the corresponding directivity axis is transverse to the unit axis. The adjustment mechanism may include a linear actuator for moving the optical signal detector and/or the optical signal generator in the focal plane relative to the optical system and parallel with the unit axis, to deflect the directivity axis along an elevation direction. The processor device may then be configured to determine an elevation angle for the received light signal relative to the housing, and to control the linear actuator to adjust the orientation of the respective directivity axis and align this orientation with the determined elevation angle.

The optical system may be formed by a system of lenses, mirrors, or combination thereof. Power usage can be significantly reduced by using a linear actuator for moving the transmitting and/or receiving elements relative to the optical system and along the focal plane thereof, to change the directivity axis of the transceiver. Preferably, this actuator mechanism is used for adjusting the transceiver directionality in elevation directions.

In a further embodiment, the housing comprises a base, and the adjustment mechanism further includes a rotary stage that supports the optical signal detector and/or generator of the communication transceiver in a rotatable manner about the unit axis and relative to the base. The processor device may then be configured to determine an azimuth angle for the received light signal relative to the housing, and to control the rotary stage to adjust and align the orientation (e.g. pan angle) of the respective directivity axis with the determined azimuth angle.

Preferably, the rotary stage supports both the imaging device and the optical signal detector and/or generator of the communication transceiver, in a jointly rotatable manner relative to the base. The unit may for instance define two opposite distal ends that are intersected by the nominal unit axis. The base may be located at one distal end, and the imaging device may be located at the opposite distal end and be rotatable relative to the base about this unit axis. The imaging device may be rotationally symmetric about the unit axis. The imaging device may for instance be formed by an omnidirectional photogrammetric camera with an azimuthal coverage of 360° and an optical centre that faces along the unit axis and away from the base.

In embodiments, the main lobe of the optical signal detector and/or the optical signal generator corresponds to a pencil beam distribution that is centred on the corresponding directivity axis. The processor device may be configured to determine an azimuth angle and an elevation angle for the received light signal relative to the housing. The adjustment mechanism may then comprise a pan-tilt actuator for adjusting an orientation (e.g. pan and tilt angles) of the pencil beam distribution relative to the housing to substantially align the directivity axis with the determined azimuth and elevation angles.

The main lobe of the transmitter and/or the receiver may have a pencil beam profile, which has narrow beam widths in both angular directions (e.g. pan, tilt) relative to the central directivity axis. The optical signal generator may for instance comprise a laser source for emitting an optical communication signal with a pencil beam-shaped directive transmitter gain distribution.

In embodiments, the optical signal detector forms a multi-region detector defining multiple sensor regions, with each sensor region being configured to sense light and to generate a light detection signal proportional to the received light intensity independently of the other sensor regions. This detector may for instance be a quadrant detector with four sensor regions that are tiled in a mutually adjoining pattern, these regions having corners that meet in a central common vertex. A controller (e.g. the processor) may then be present and configured to adjust an orientation of the receiver directivity axis (e.g. by controlling the pan-tilt actuator), in order to centre a cross-sectional projection of the received beam associated with the optical communication signal onto the central common vertex of the sensor regions. The adjustment mechanism may be controlled based on comparison of the (potentially different) detection signals from the distinct sensor regions, and striving to reduce an imbalance between those detection signals. When all sensor regions (e.g. quadrants) generate the same detection amplitude, the device may be considered pointed at the transmitting light source. Advantageously, detection signals from the sensor regions of the multi-region detector will be correlated, whereas noise of the individual sensor regions will be uncorrelated.

In a further embodiment, the communication unit further includes an optical system (e.g. lenses and/or mirrors) for focussing an incoming beam associated with the optical communication signal onto the multi-region detector. The unit may also include a further actuator, which is configured to adjust a linear position of a focal point of the optical system along the receiver directivity axis and relative to the multi-region detector. The controller may then be configured to control the further actuator and to adjust this relative linear position, so that the incoming beam will be projected out of focus onto the multi-region detector and will cover all sensor regions to facilitate comparison between the detection signals.

In yet a further embodiment, the communication unit is configured to operate in a reception beam follower mode> This mode may be activated in case the optical signal is coming from a source that is gradually moving relative to the communication unit (e.g. from a transceiver mounted on an ROV). In this mode, the controller continuously compares detection amplitudes generated by the sensor regions, and adjusts the position of the optical system relative to the multi-region detector in order to maintain an out-of-focus state and ensure that the received light beam will continue to impinge on all sensor regions of the detector and allow repeated comparison of the signal amplitudes from all sensor regions. The controller uses the signal differences resulting from the comparison to drive the actuator mechanism and adjust the orientation of the receiver and optical system relative to the base of the unit so as to stay pointed at the moving light source.

In embodiments, the main lobe of the optical signal detector and/or the optical signal generator corresponds to a fan beam distribution that is centred on the corresponding directivity axis and is strongly bundled in an azimuth direction. The processor device may be configured to determine only an azimuth angle for the received light signal relative to the housing. The adjustment mechanism may then comprise a pan drive for adjusting an orientation of the fan beam distribution relative to the housing to substantially align the fan beam distribution with the determined azimuth angle.

The main lobe of the transmitter and/or the receiver may have a fan beam profile, which has a relatively narrow beam width in one angular direction and a relatively wide beam width in another angular direction, both directions defined relative to the directivity axis. The main lobe may be oriented such that the wide beam dimension extends substantially along the rotation axis of the pan drive, and that the narrow beam dimension substantially corresponds with the azimuthal repositionability by the pan drive. In this case, only a pan drive may suffice to align the fan beam with the determined azimuth angle associated with the observed target, to benefit from the increased transmitter and/or receiver sensitivity. The optical signal generator may for instance comprise a laser line generator for emitting an optical communication signal with a fanbeam-shaped gain distribution.

In embodiments, the optical signal detector and the optical signal generator are fixed relative to each other and form an integrated transceiver unit. The adjustment mechanism may then comprise an actuator for simultaneously adjusting the main lobes and aligning the orientations of the directivity axes with the at least one directional coordinate.

In embodiments, the communication unit comprises a further light source that is configured to omnidirectionally emit at least one of an optical beacon signal and a further optical communication signal. The unit may include a separate omnidirectional light source for temporarily emitting light in all directions and allow a similar unit in the vicinity to initially localize this unit using its camera and processor, to allow the other unit to direct its communication transmitter and/or receiver towards the first unit. The further light source may be a beacon light that may radiate in a continuous manner, or be part of an additional omnidirectional optical communication transceiver.

According to a second aspect, and with the advantages and effects described herein above with reference to the first aspect, there is provided a method for using a communication unit according to the first aspect. The method comprises:

deploying the communication unit and an underwater vehicle underwater, at non-coinciding positions and within optical communication range;
  emitting an optical signal with the underwater vehicle;
  determining at least one directional coordinate for the received optical signal;
  adjusting a directivity axis of the optical signal detector and/or optical signal generator of the communication transceiver relative to the housing, to align the orientation of the directivity axis with the at least one directional coordinate;
  establishing a wireless optical communication link between the communication transceiver of the unit and a communication transceiver of the underwater vehicle;
followed by at least one of:
  controlling the underwater vehicle (e.g. by a shore-based pilot) via the communication unit and the established communication link, to let the underwater vehicle execute intervention or inspection operations;
  transmitting data acquired by the communication unit via the established communication link to the underwater vehicle, and
  receiving, with the communication unit, data from the underwater vehicle, and streaming the received data with the communication unit to a remote control station.

The underwater vehicle may for instance be an autonomous underwater vehicle (AUV) or a remotely operable vehicle (ROV). The unit may form part of a wireless network of deployed communication units, and/or be connected to a wired underwater network. The wireless optical link established between the vehicle and the communication unit allows data from the vehicle to be streamed via the unit back to shore. Alternatively or in addition, the link allows the vehicle to be remotely controlled to execute intervention or inspection tasks. Alternatively or in addition, the link allows the vehicle to access data acquired by the unit.

In an embodiment, the communication unit comprises an underwater imaging device. Determining the at least one directional coordinate for the received optical signal may then comprise receiving the optical signal with the imaging device.

In a further embodiment, the data acquired by the communication unit is image data of the surroundings of the unit acquired by the imaging device. The vehicle may for instance be an ROV that is used to perform inspection, repair, or maintenance (IRM) on subsea oil and gas assets. The image data may be streamed in real time to the ROV via the communication link, which allows the ROV pilot to obtain additional visual information of the scene from another perspective.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements.

FIG. 3b shows details of part of the communication unit from FIG. 3a;

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures.

Figure 1:
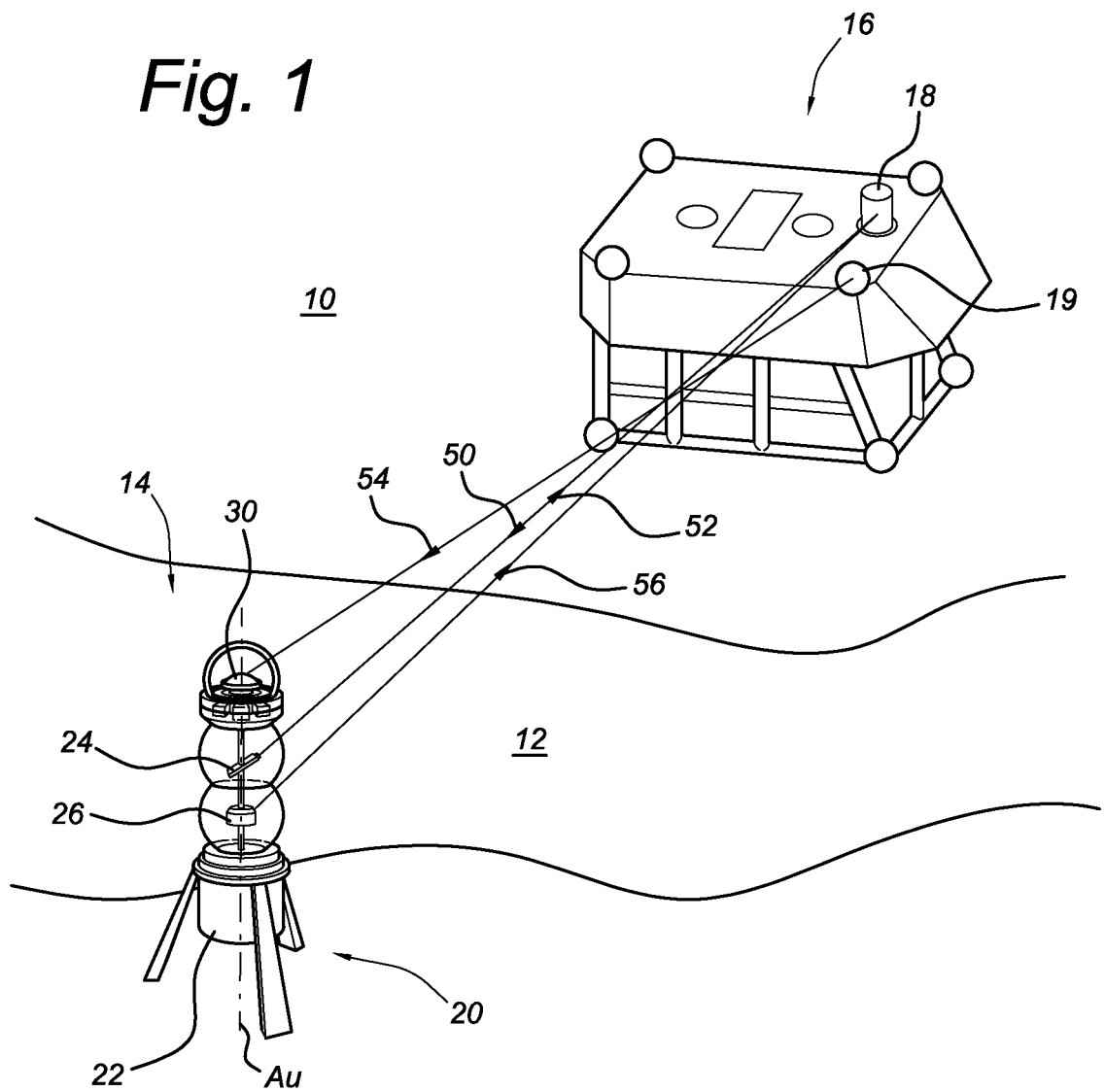
FIG. 1 schematically shows an embodiment of an underwater wireless communication unit.

FIG. 1 schematically shows a perspective view of an exemplary communication unit 20 and an underwater vehicle 16. The unit 20 and the vehicle 16 are deployed in a body of seawater 10 at distinct positions but within optical communication range. The unit 20 is deployed in a stationary manner on a surface 14 of a seabed 12, with a nominal unit axis Au that is substantially perpendicular to the surface 14. The vehicle 16 remains moveable through the water 10, and free to change its position and orientation relative to the surface 14.

The unit 20 comprises a housing 22, which accommodates various electronic components 24, 26, 30 in a watertight and pressure resistant manner. A directional communication transceiver 24 and an omnidirectional communication transceiver 26 are accommodated in an optically transparent medial part of the housing 22. An underwater imaging device 30 is located in an optically transparent spherical dome on a top side of the housing 22. This imaging device 30 is configured to acquire image data of objects and light sources in the unit's vicinity. In deployed state, the imaging device 30 and transceivers 24, 26 protrude above the surface 14, to provide line of sight to the vehicle 16 and to other units 20 in the vicinity (if present).

In this example, the vehicle 16 is a ROV or UAV that includes a wireless optical transceiver 18, which is configured to emit optical communication signals 50 and to receive optical communication signals 52 from transceivers 24 of nearby observation units 20. The transceivers 18, 24, 26 of the communication unit 20 and the vehicle 16 are adapted to cooperate and establish optical communications links with different data rates and quality.

Figure 2:
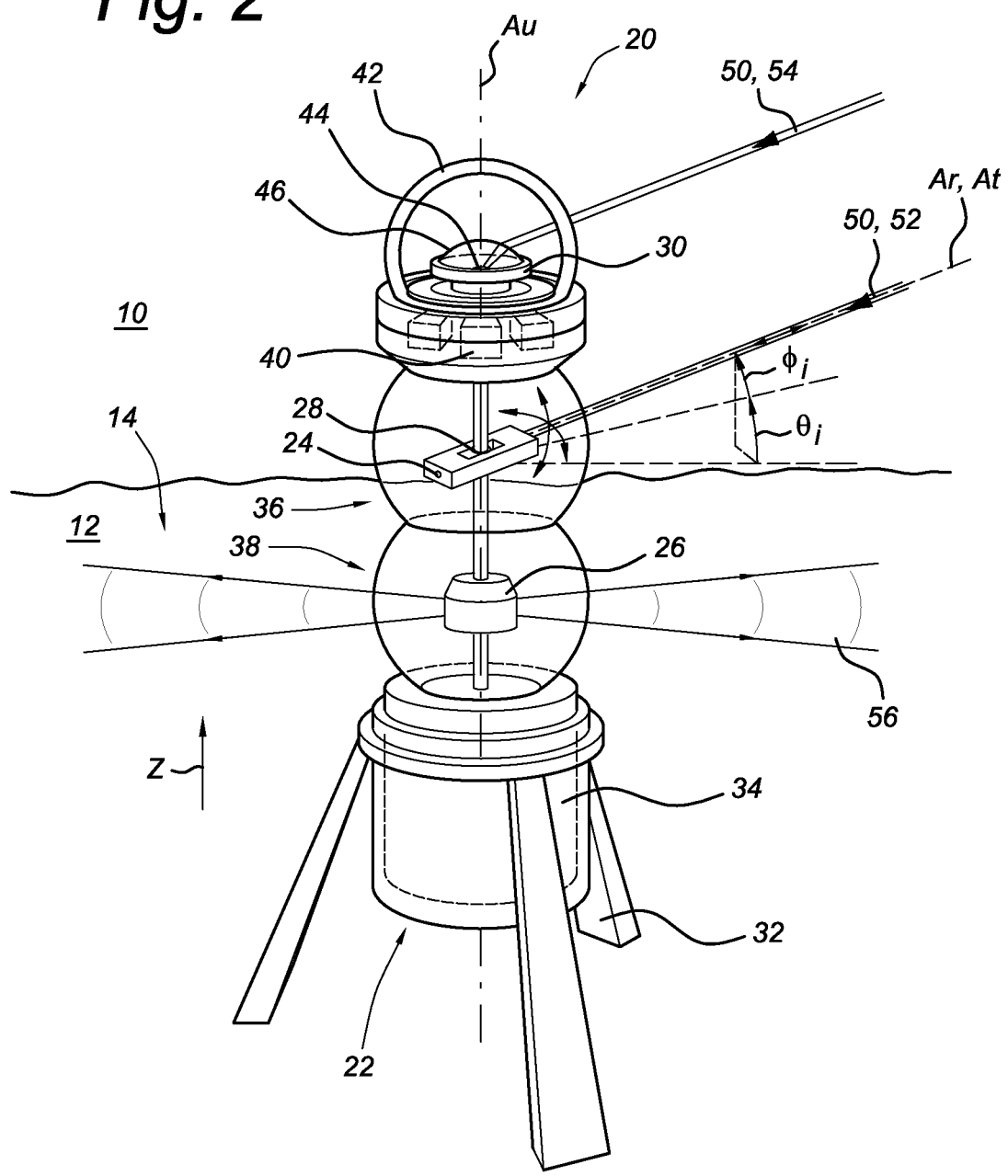
FIG. 2 schematically shows the communication unit from claim 1 in more detail.

FIG. 2 shows a more detailed view of the communication unit 20 from FIG. 1. The housing 22 of unit 20 has an elongated shape that extends along and is centred on the unit axis Au. The housing 22 comprises a base 32 with a power supply 34 at one distal end of the housing 22, as well as an imaging device 30 that is stationary relative to the base 32 but located at an opposite distal end of the housing 22.

This imaging device 30 may be formed by an omnidirectional photogrammetric camera that is accommodated inside a hyper-hemispherical dome 42 of optically transparent material. The camera 30 has an azimuthal coverage of 360° and an optical centre that faces upwards along the unit axis Au and away from the base 32. The camera 30 includes a digital imaging sensor 44 and a fish-eye lens 46 for receiving and refracting incoming rays of light from the unit's surroundings, and projecting this light onto the sensor 44. The fish-eye lens 46 confers an omnidirectional UW-FOV upon the camera 30, which allows instantaneous imaging of a large portion of the surroundings in which underwater vehicles 16 and other units 20' are expected to reside. The camera 30 is adapted to acquire image data of light signals 50, 54 approaching the communication unit 20 from light sources 18, 19 located in the vicinity. These signals may for instance be beacon signals 54 from a vehicle beacon light 19, or communication signals 50 from the vehicle's optical transceiver 18.

The directional communication transceiver 24 includes an optical signal detector that has a directive gain with a main lobe centred on a receiver directivity axis Ar. This detector is configured to receive an optical communication signal 50 approaching the unit through the main lobe. The directional transceiver 24 also includes an optical signal generator that has a directive gain with a main lobe centred on a transmitter directivity axis At. This generator is configured to emit an optical communication signal 52 along the transmitter directivity axis and away from the unit 20. The main lobes of the optical detector and generator correspond to pencil beam distributions, which are centred on the respective directivity axes Ar, At. The optical detector and generator are aligned with and fixed relative to each other, to form an integrated transceiver unit 24 in which the main lobes overlap and the directivity axes Ar, At coincide.

The unit 20 includes an adjustment mechanism 28, which is configured to adjust an orientation of the signal generator and detector relative to the housing 22, so that the orientation of the directivity axes Ar, At can be changed relative to the housing 22. In this example, the adjustment mechanism 28 is a pan-tilt actuator, adapted for simultaneously adjusting the pan and tilt angles of the pencil beam distributions and directivity axes Ar, At relative to the housing 22 along azimuth and elevation directions.

The processor device 40 is configured to receive the image data from the camera 30, and to determine directional coordinates for the light signal relative to the camera 30. Via initial calibration procedures, a pixel region where a received light signal 50, 54 hits the sensor 44 can be associated with directional coordinates relative to a local reference frame defined with respect to the camera 30. In this example, the directional coordinates are the elevation angle $\Theta i$ and azimuth angle $\Phi i$. Alternative implementations may instead use directional cosines, or another angular coordinate system. Based on the directional coordinates, the processor device 40 can control the pan-tilt actuator 28 to automatically reposition the optical generator and detector, and align the orientation of the directivity axes Ar, At with the directional coordinates $\Phi i$, $\Theta i$. This automatic alignment of the directional transceiver 24 allows a communication link between the unit 20 and the communication device of an observed target (e.g. the vehicle 16 or another unit 20) to be quickly established, or recovered after a link failure.

In view of the slight displacement between the camera 30 and the directional transceiver 24 along the unit axis Au, the elevation angle of the directional transceiver 24 may have to be adjusted slightly upwards to improve performance. The amount of correction depends on the distance to the target, and may for instance be determined by ranging techniques.

FIGS. 1 and 2 further illustrate methods for wireless optical communication between a unit 20 and a underwater vehicle 16 within optical communication range. The camera 30 of the unit 20 acquires image data of the beacon signals 54 emitted by the vehicle's light beacon 19. The unit's processor device 40 determines directional coordinates $\Phi i$, $\Theta i$ for the light beacon 19 relative to the reference frame of the camera 30. The processor 40 then controls the pan-tilt actuator 28, to re-orient the transceiver 24 relative to the housing 22 so that the main lobes and directivity axes Ar, At of the transceiver 24 are aligned with the determined directional coordinates $\Phi i$, $\Theta i$.

Subsequently, the transceiver 24 is activated to transmit control data via optical signals 52 to the vehicle's transceiver 18. In this manner, control data may be sent via the communication unit 20 to the underwater vehicle 16, to remotely control the vehicle 16 and let the vehicle execute intervention or inspection operations. Alternatively or in addition, image data acquired by the camera 30 may be transmitted by the unit via the established communication link to the underwater vehicle 16.

Conversely, data from the vehicle 16 may be communicated via the established communication link to the communication unit 20. In turn, the unit 20 may stream the received data to a remote control station. For this end, the communication unit 20 may additionally include an acoustic modem (not shown), which is configured to upload positioning data to a vessel or structure at the surface of the sea 10. Alternatively or in addition, the unit 20 may be in signal communication via a wired connection with a nearby underwater data access point (also not shown).

Figure 3A:
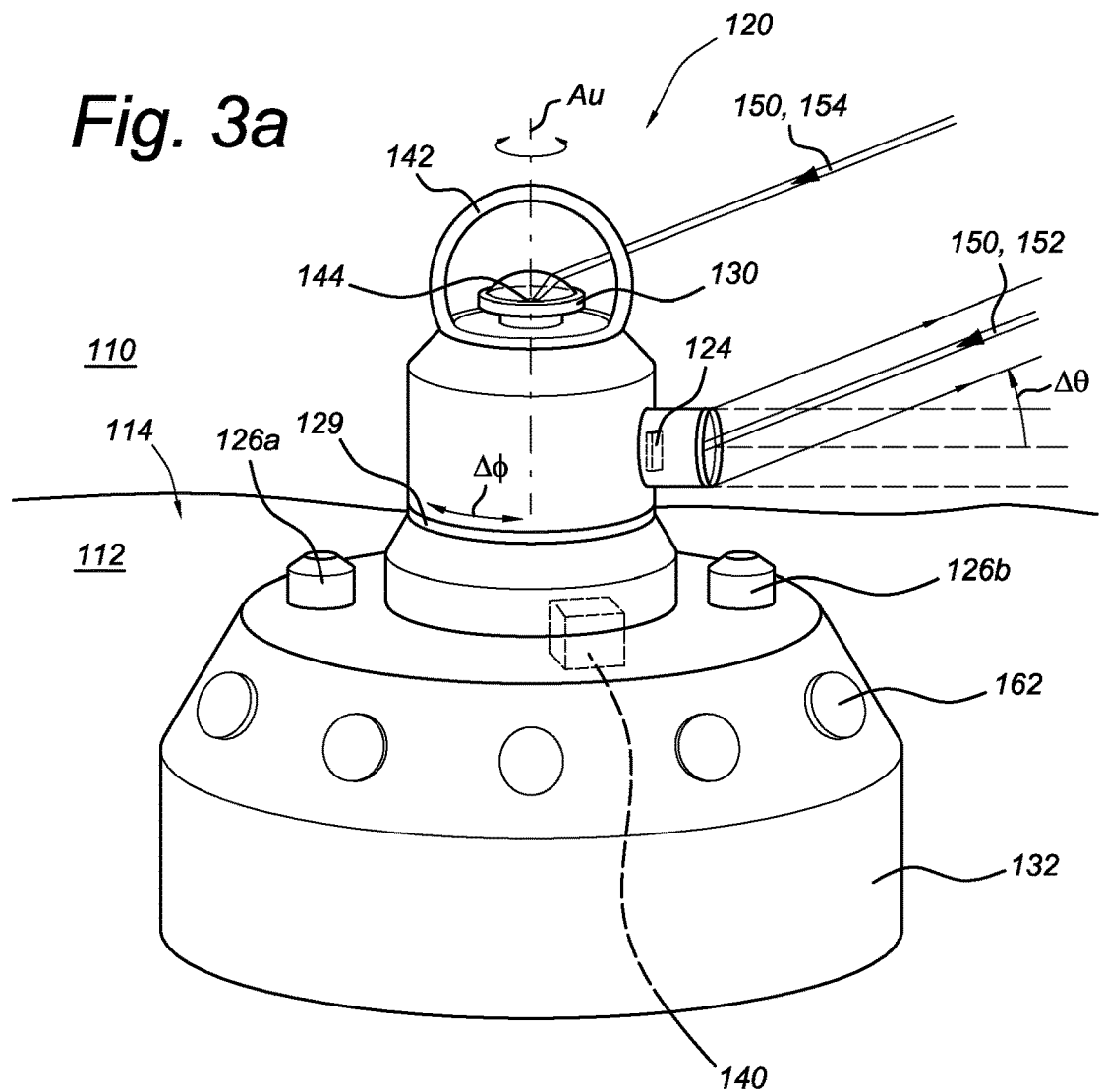
FIG. 3a schematically shows an underwater wireless communication unit according to another embodiment.
Figure 3B:
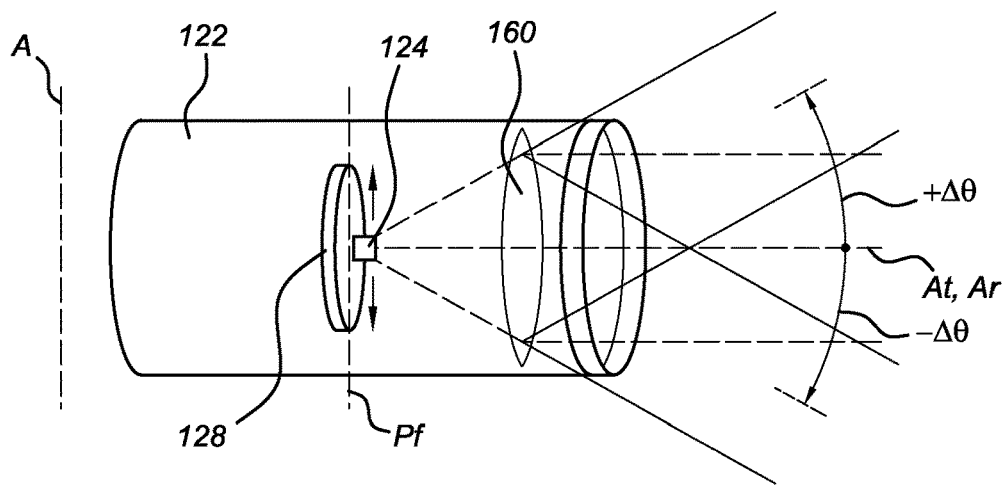

FIGS. 3a-3b show another embodiment of a communication unit 120. Features in the unit 120 that have already been described above with reference to the first unit 20 (and in particular FIGS. 1-2) may also be present in the unit 120 in FIGS. 3a-b, and will not all be discussed here again. Like features are designated with similar reference numerals preceded by 100 to distinguish the embodiments.

FIG. 3a illustrates that the housing 122 is centred on a unit axis Au that is essentially perpendicular to the supporting surface 14 of the seafloor 112. A lower part of the housing 122 forms a base 132, which is supported by and stationary relative to the underlying seafloor 112. The base 132 accommodates a processor device 140 and a power supply (not shown).

An upper part of the housing 122 includes a directional communication transceiver 124 on a lateral side of this housing part, and a camera 130 at an upper distal end of this housing part. The camera 130 is similar to the one in the previous embodiment.

The unit 120 comprises a rotary stage 129, which supports the upper housing part in a rotatable manner, and allows rotation of the transceiver 124 and camera 130 about the unit axis Au along the azimuth direction Φ and relative to the base 132.

The base 132 further includes omnidirectional optical transceiver units 126a, 126b, and a plurality of floodlights 162 mounted in a regular angular distribution along a lateral surface of the base 132. The omnidirectional transceivers 126 allow the unit 120 to be controlled by a moving platform (e.g. the ROV 16 from FIG. 1), without relying on the high speed link via the communication transceiver 124 (which may not yet have been stablished). The floodlights 162 may be selectively powered to radiate light within selected angular sectors around the unit 120, to illuminate parts of the unit's surroundings with sufficient intensity levels to be registered by the imaging device 130. These lights 162 may be selectively (de)activated by remote control from the moving platform via the omnidirectional transceivers 126.

FIG. 3b illustrates that the transceiver 124 includes a lens system 160, which defines a focal plane Pf that is substantially parallel with the unit axis Au. The optical signal detector and generator of the transceiver 124 are both located in the focal plane Pf, and the directivity axes At, Ar are transverse to the unit axis Au. The transceiver adjustment mechanism includes a linear actuator 128, which is adapted to move the optical signal detector and generator within the focal plane Pf and parallel with the unit axis Au, to position the detector and generator relative to the lens system 160. This will cause the main lobes and directivity axes At, Ar to deflect in elevation direction ±Θ.

The processor device 140 is configured to determine an azimuth and elevation angles Φi, Θi for the received light signal 150, 154 relative to the housing 122. The processor device 140 controls the linear actuator 128 to adjust and align the orientation of the directivity axes At, Ar with the determined elevation angle Θi. In addition, the processor device 140 controls the rotary stage 129 to adjust and align the orientation of the directivity axes Ar, At with the determined azimuth angle Φi.

Video image data acquired by the camera 130 may then be streamed to the moving platform via the high bandwidth communication link established with the directional transceiver 124. A pilot of the moving platform may thus obtain live video data of the scene from the unit's perspective, to assist IRM operations.

Figure 4:
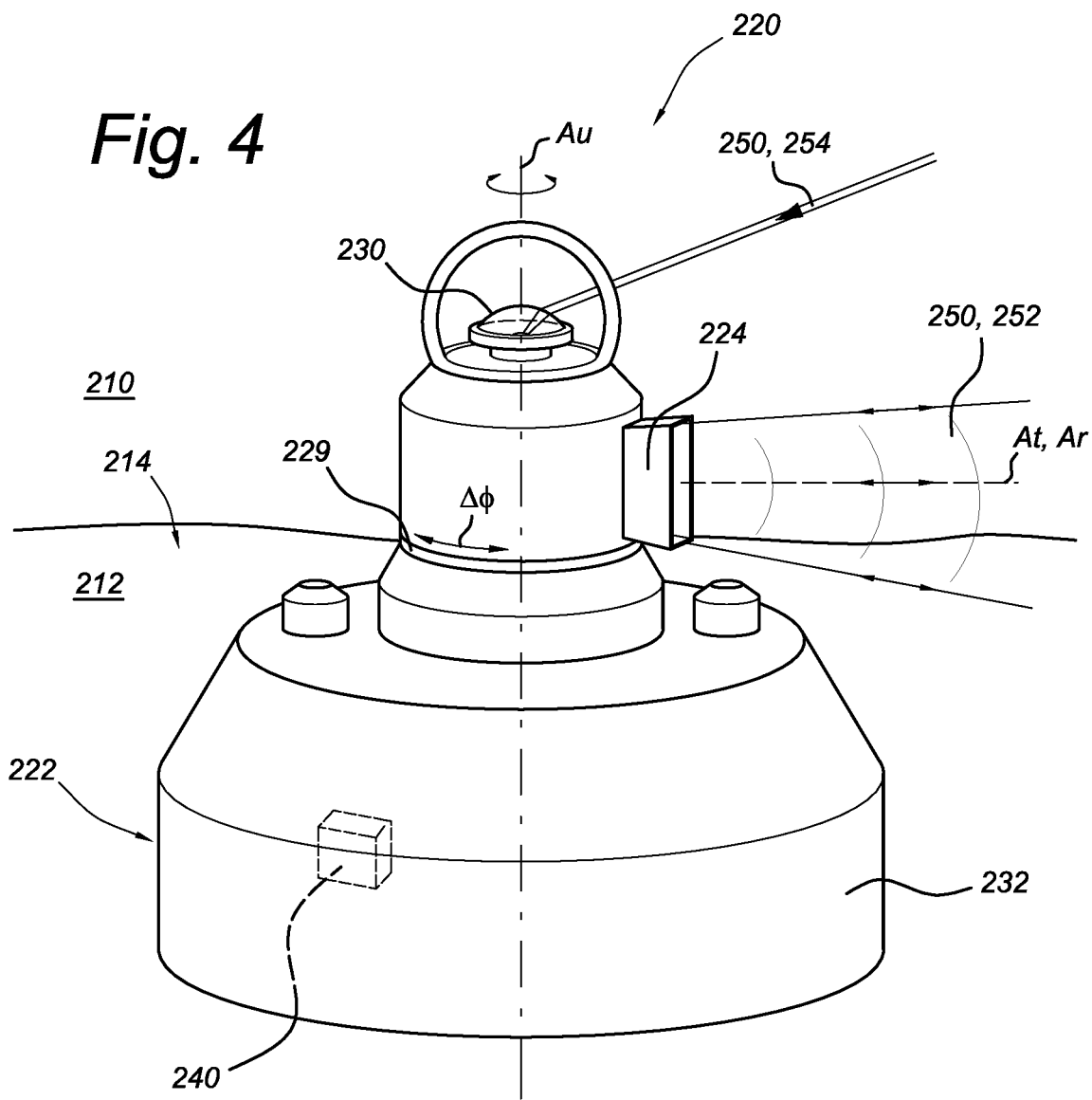
FIG. 4 schematically shows an underwater wireless communication unit according to yet another embodiment, and FIGS. 5-12 schematically show optical systems for transmitters and/or receivers in various embodiments.

FIG. 4 shows yet another communication unit 220, which is largely similar to the unit 120 discussed with reference to FIGS. 3a-3b. Like features are designated with similar reference numerals preceded by 200 to distinguish the embodiments. In this unit 220, the main lobes of the optical signal detector and generator correspond to fan beam distributions that are centred on the directivity axes Ar, At. These fan beams have a narrow beamwidth in the azimuth direction Φ (i.e. strongly bundled, e.g. with a −3 dB width of only a few degrees away from the optima at axes At, Ar), but have a substantially wider beamwidth in the elevation direction Θ (e.g. of several tens of degrees away from the optima at axes At, Ar).

In this example, the processor device 240 is configured to only determine an azimuth angle Φi for the received light signal 250, 254 relative to the housing 222. Here, only the rotary stage 229 serves to adjust the azimuth angle of the transmitter and receiver fan beams relative to the stationary base 232, to substantially align the fan beams with the detected azimuth angle Φi and allow the directional transceiver 224 to establish a high-bandwidth optical link with a transceiver of the source of the optical communication signal 250.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope. Several exemplary alternatives are discussed below with reference to FIGS. 5-12. Features that have already been described above with reference to the embodiments in FIGS. 1-4 may also be present in the embodiments in FIGS. 5-12, and like features are designated with similar reference numerals preceded by multiples of 100 to distinguish the embodiments.

Figure 5:
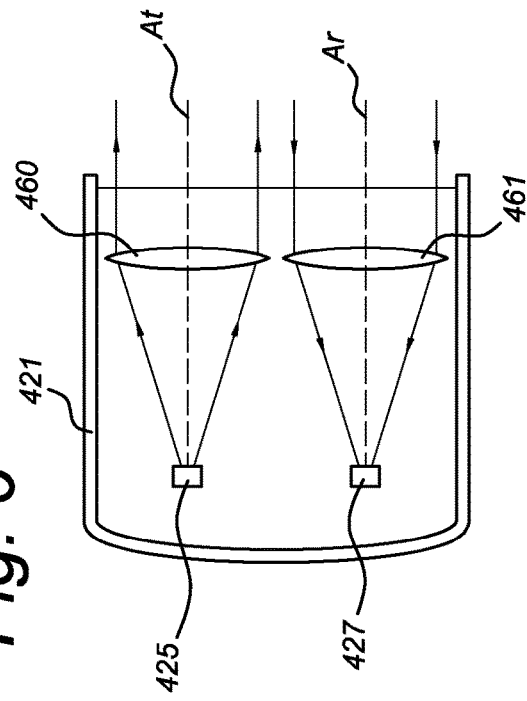

FIG. 5 illustrates an embodiment wherein an optical transmitter 325 and corresponding convex lens 360 are aligned along a transmitter axis At and accommodated in a dedicated transmitter housing 321. An optical receiver 327 and associated convex lens 361 are accommodated in a receiver housing 323 that is separate from the transmitter housing 321, and are aligned along a receiver axis Ar that is parallel with but displaced relative to the transmitter axis At. Both transmitter and receiver housings 321, 323 and the optical components accommodated therein are moveably supported relative to the base of the communication unit. Their orientations relative to this base can be adjusted by means of an adjustment mechanism, similar to elements 22 and 28 in FIG. 2.

Figure 6:
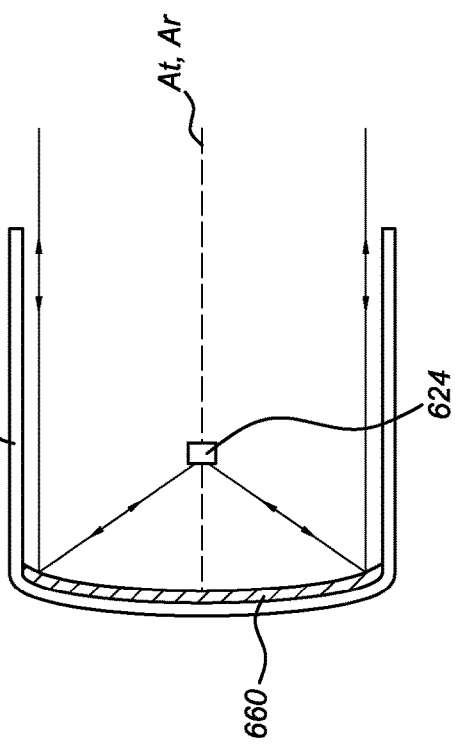

FIG. 6 illustrates an embodiment wherein the transmitter 425, the receiver 427, and associated convex lenses 460, 461 form separate units, which are all accommodated in the same housing 421. These optical components are arranged such that the transmitter and receiver axes At, Ar are parallel and extend through the same housing aperture, while the associated beams have only little overlap.

Figure 7:
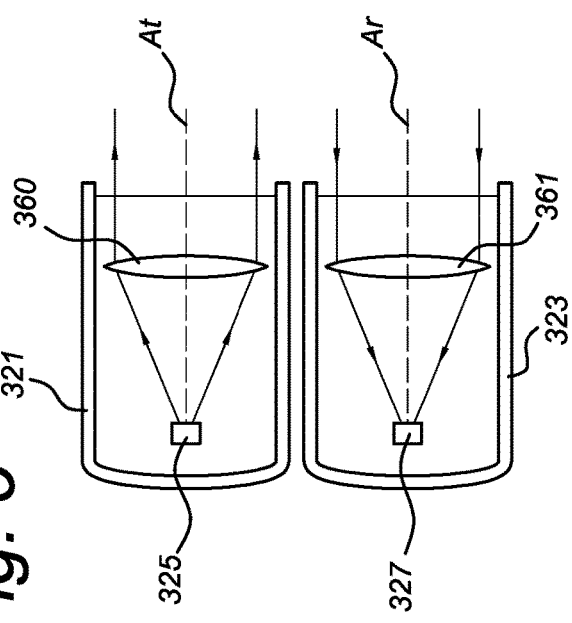

The embodiment in FIG. 7 resembles FIG. 6, but includes a single lens body 560 with two separate focal points, each respective point being associated with the transmitter 525 or the receiver 527 and being aligned with its respective axis At, Ar.

Figure 8:
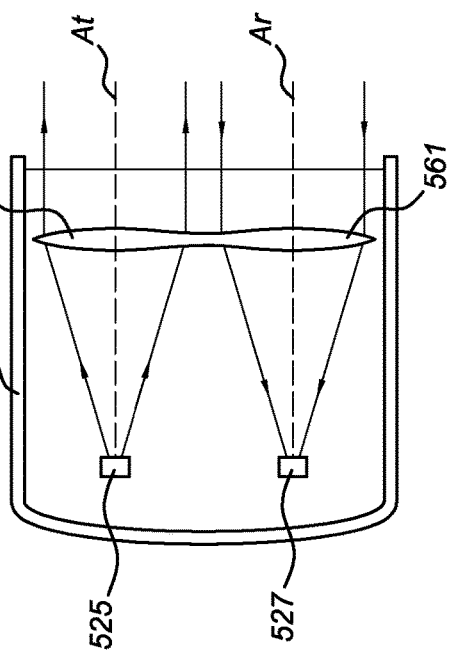

FIG. 8 shows an embodiment wherein optical transmitter and receiver parts are combined in a single transceiver component 624. A concave mirror 660 is used as optical element for collimating the outbound optical beam from the transmitter part of the transceiver 624, and for focussing the inbound optical beam received by the receiver part of the transceiver 624. Here, the transmitter and receiver axes At, Ar are parallel and coaxially aligned.

Figure 9:
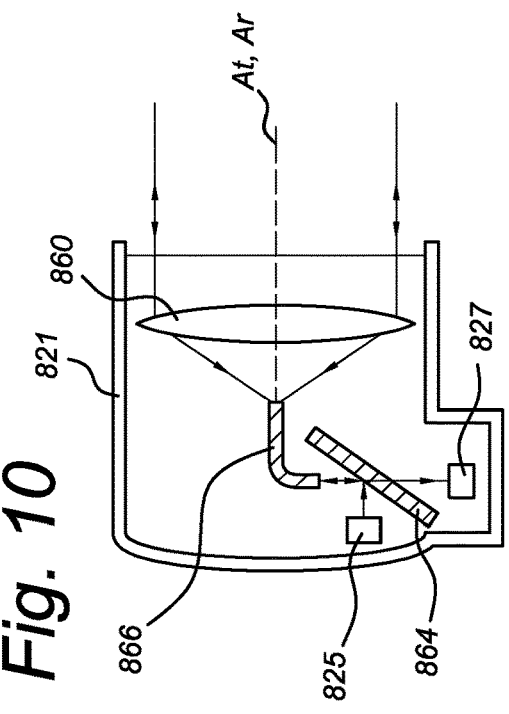

FIG. 9 shows an embodiment configured for simplex optical communication, which comprises separate transmitter and receiver components 725, and a semi-transparent plate mirror 764 oriented at an angle of 45° relative to the optical axis of the lens 760. In this example, the transmitter and receiver axes At, Ar are co-axial. The transmitter 725 is arranged inside the housing 721 at a non-zero transverse distance from the mirror 764 and the lens axis, and at 90° angle relative to this lens axis. The receiver 727 is located at the lens axis and behind the mirror 764. Alternatively, mirror 764 may be substituted by a 3 dB beam splitter prism.

Figure 10:
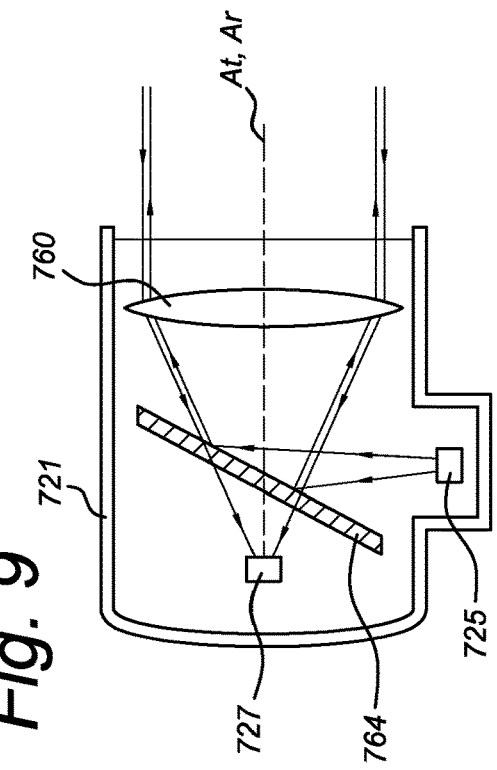

FIG. 10 shows an embodiment configured for simplex communication, which includes a beam splitter plate 864 and an optical fibre 866. The fibre 866 is configured to convey the outbound optical signal that originates from the transmitter 825 (and reflection by plate 864) towards the lens 860, and is also configured to convey the inbound optical signal propagating from the lens 860 towards the plate 864 (and then through the plate 864 towards the receiver 827).

Figure 11:
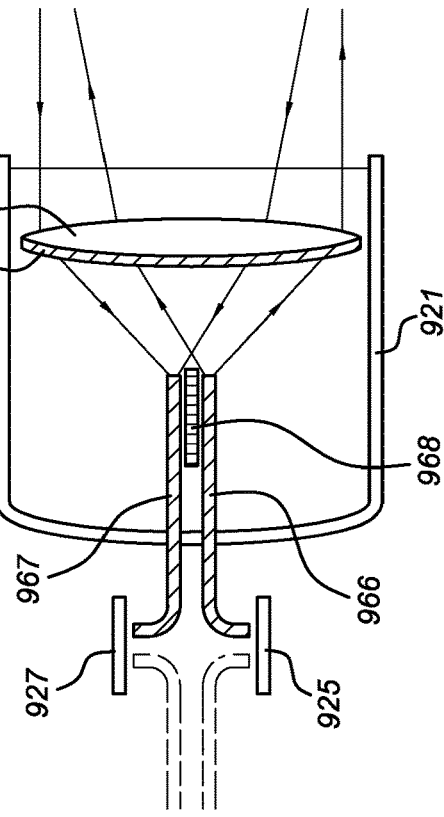

FIG. 11 shows an embodiment configured for full duplex optical communication, which comprises two optical fibres 966, 967, and a separator member (e.g. a screen) 968 placed directly in-between distal ends of the fibres 966, 967. The fibres 966, 967 may be mounted on opposite sides of the screen 968, so as to avoid crosstalk between the optical signal from the transmitter 925 and the associated fibre 966 on the one hand, and the optical signal received by the receiver 927 via the associated fibre 967 on the other hand. An inner proximal side of the lens 960 includes an anti-reflective (AR) coating 965, configured to prevent signals coming from the transmitter 925 from being reflected by the lens 960 back to the receiver 927. The beam associated with the transmission signal diverges such that it partly overlaps the field of view associated with the optical system of the receiver 927.

Figure 12:
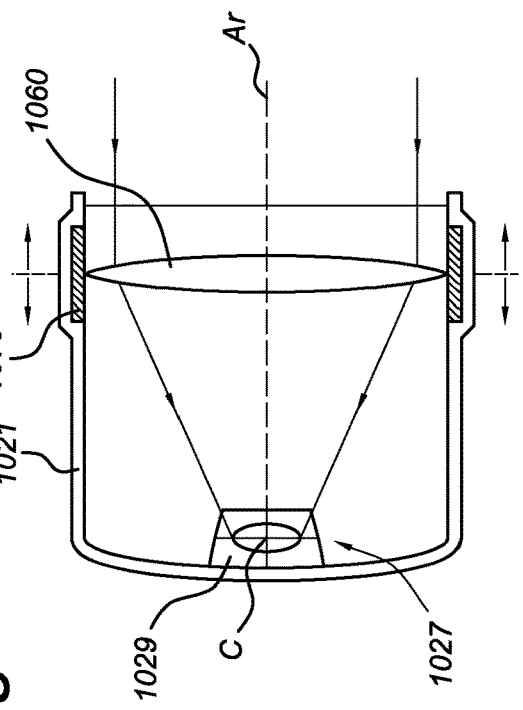

FIG. 12 shows an embodiment configured to operate in a reception beam follower mode. The housing 1021 accommodates receiver 1027, lens element 1060, and lens actuator 1070. At least part of the housing 1021 is rotatably mounted so as to allow joint rotation of the housing 1021 and optical components along azimuth and elevation directions relative to the base of the communication unit (e.g. using pan-tilt actuator 28 in FIG. 2). The receiver 1027 includes a quadrant detector 1029 that is aligned with the lens 1060 and centred on its optical axis Ar. An incoming light beam with elliptical (e.g. circular) symmetry propagating close to and predominantly along the optical axis Ar will form an elliptical projection on the light-sensitive surface of the quadrant detector 1029. The quadrant detector 1029 includes four distinct sensor regions, each region configured to provide a separate signal amplitude associated with an intensity of the light that impinges on this sensor region. The sensor regions have corners that meet in a central common vertex C. A processor of the communication unit may then be configured to continuously compare the detection amplitudes of these sensor regions, and to use the results of this comparison to drive the actuator mechanism and fine-tune the orientation of the housing 1021 with receiver 1027 and lens 1060 relative to the base of the unit, by keeping a cross-sectional projection of the received beam centred on the common vertex C. This signal comparison and fine-tuning may proceed as long as the quadrant detector 1029 receives a light signal and the signal amplitudes from the distinct sensor regions remain different, but may cease once the signal amplitudes from all sensor regions become substantially identical, implying that the optical axis Ar is pointed at the external light source. The lens actuator 1070 is configured to adjust a linear position of the lens 1060 back-and-forth along the optical axis Ar and relative to the housing 1022 and detector 1029, to allow the transverse width of the reception field-of-view and the cross-sectional size of the elliptical signal projection on the detector 1029 to be adjusted. The communication unit may thus be configured to search initially for an optical signal maximum within a relatively wide field-of-view, using coarse adjustment of the orientation of the receiver 1027 and lens 1060 to detect an optical signal. After an optical signal has been detected by the quadrant detector 1029, the communication unit may iteratively fine-tune the rotation angles and narrow the field-of-view, to improve alignment and signal strength for the received optical signal.

The communication unit is further configured to operate in the follower mode, in case the optical signal originates from a source that is moving relative to the unit (e.g. coming from a transceiver 18 mounted on an ROV 16 as shown in FIG. 1). In this mode, the position of the lens 1060 is continuously or intermittently adjusted to ensure that the received light will continue to impinge on all sensor regions of the quadrant detector 1029, to allow continuous comparison of the signal amplitudes from all sensor regions. In alternative embodiments, an actuator may be provided and configured to move the quadrant detector directly, while keeping the lens static relative to the housing.

The exemplary units described above with reference to FIGS. 1-4 included omnidirectional transceivers in addition to the directional and repositionable transceiver. In alternative embodiments, the unit may include an optical beacon for omnidirectionally emitting an optical beacon signal, which may be received by another unit in the vicinity and used to localize this unit and redirecting its directional transceiver before establishing an inter-unit communication link.

The skilled person will understand that the application of an underwater imaging device for determining directional coordinate(s) for observed light sources and an optical communication transmitter and/or receiver with automatically adjustable transmitter and/or receiver main lobes along the directional coordinate(s) should not be considered limited to stationary underwater monitoring units as described in the above exemplary embodiments. Application of these principles in other underwater wireless optical communication devices, which may form part of various types of underwater systems, stations, or vehicles, is also envisioned.

LIST OF REFERENCE SYMBOLS 10 body of water (e.g. seawater)
12 submerged earth layer (e.g. seafloor)
14 submerged earth surface 16 underwater vehicle (e.g. ROV or UAV)
18 vehicle transceiver
19 light beacon
20 underwater wireless optical communication unit
22 housing
24 communication transceiver
26 further communication transceiver
28 adjustment mechanism
30 imaging device (e.g. underwater photogrammetric camera)
32 base
34 power supply (e.g. battery)
36 first housing part
38 second housing part
40 processor device
42 transparent dome
44 imaging sensor
46 refractor optics (e.g. fish-eye lens)
50 optical communication signal (from vehicle)
52 optical communication signal (from unit)
54 optical beacon signal
56 further optical communication signal
128 linear actuator
129 rotary stage
150 optical system
162 floodlight
229 pan drive
321 transmitter housing
323 receiver housing
325 optical transmitter
327 optical receiver
360 transmitter lens
361 receiver lens
560 concave mirror
764 beam splitter
866 optical fibre
965 anti-reflective coating
966 transmitter fibre
967 receiver fibre
968 barrier
1027 optical receiver
1029 quadrant detector
1070 lens actuator
Z axial direction
R radial direction
Φ first angular direction (azimuthal direction)
Θ second angular direction (elevation direction)
Φi azimuth coordinate for target i
Θi elevation coordinate for target i
Au unit axis
Ar receiver directivity axis
At transmitter directivity axis
C common vertex
Dr receiver directive gain distribution
Dt transmitter directive gain distribution
Pf focal plane

The invention claimed is:

1. A communication unit for wireless optical communication in an underwater environment, the unit comprising:
 a communication transceiver, including an optical signal detector that has a directive gain with a main lobe centred on a receiver directivity axis (Ar) and which is configured to receive an optical communication signal approaching the unit through the main lobe, and/or an optical signal generator that has a directive gain with a main lobe centred on a transmitter directivity axis (At) and which is configured to emit an optical communication signal along the transmitter directivity axis and away from the unit;
 a housing, accommodating the communication transceiver;
 an adjustment mechanism configured to adjust an orientation of the receiver directivity axis and/or an orientation of the transmitter directivity axis relative to the housing;
 a processor device configured to determine at least one directional coordinate (Φi, Θi) for a light signal approaching the communication unit from a light source (18, 19) located in the vicinity, and to control the adjustment mechanism to automatically adjust and align the orientation of the receiver directivity axis with the determined at least one directional coordinate, and/or to automatically adjust and align the orientation of the transmitter directivity axis with the at least one directional coordinate.

2. The communication unit according to claim 1, comprising an underwater imaging device, configured to acquire image data of the light signal;
 wherein the processor device is configured to receive the image data from the imaging device, to determine the at least one directional coordinate (Φi, Θi) for the light signal relative to the imaging device, and to control the adjustment mechanism, to automatically adjust and align the orientation of the respective directivity axis (Ar, At) with the at least one directional coordinate.

3. The communication unit according to claim 1, wherein the housing extends along a nominal unit axis (Au), and wherein the unit comprises:
 an optical system that defines a focal plane substantially parallel with the unit axis, such that the optical signal detector and/or the optical signal generator of the communication transceiver is located in the focal plane and the corresponding directivity axis (At, Ar) is transverse to the unit axis;
 wherein the adjustment mechanism includes a linear actuator for moving the optical signal detector and/or the optical signal generator in the focal plane relative to the optical system and parallel with the unit axis, to deflect the directivity axis (At, Ar) along an elevation direction;
 and wherein the processor device is configured to determine an elevation angle (Θi) for the received light signal relative to the housing, and to control the linear actuator to adjust and align the orientation of the respective directivity axis (At, Ar) with the determined elevation angle (Θi).

4. The communication unit according to claim 3, wherein the housing comprises a base;
 wherein the adjustment mechanism further includes a rotary stage that supports the optical signal detector and/or the optical signal generator of the communication transceiver a rotatable manner about the unit axis (Au) and relative to the base;
 and wherein the processor device is configured to determine an azimuth angle (Φi) for the received light signal relative to the housing, and to control the rotary stage to adjust and align the orientation of the respective directivity axis (Ar, At) with the determined azimuth angle (Φi).

5. The communication unit according to claim 4, and further comprising an underwater imaging device, configured to acquire image data of the light signal;

wherein the processor device is configured to receive the image data from the imaging device, to determine the at least one directional coordinate ($\Phi i$, $\Theta i$) for the light signal relative to the imaging device, and to control the adjustment mechanism, to automatically adjust and align the orientation of the respective directivity axis (Ar, At) with the at least one directional coordinate, wherein the imaging device is rotatable together with the communication transceiver by the stage, and wherein the imaging device is rotationally symmetric about the unit axis (Au).

6. The communication unit according to claim 1, wherein the main lobe of the optical signal detector and/or the optical signal generator corresponds to a pencil beam distribution that is centred on the corresponding directivity axis (Ar, At);

wherein the processor device is configured to determine an azimuth angle ($\Phi i$) and an elevation angle ($\Theta i$) for the received light signal relative to the housing;

and wherein the adjustment mechanism comprises a pan-tilt actuator for adjusting an orientation of the pencil beam distribution relative to the housing to substantially align the directivity axis with the determined azimuth and elevation angles ($\Phi i$, $\Theta i$).

7. The communication unit according to claim 1, wherein the optical signal detector forms a multi-region detector, for instance a quadrant detector, defining multiple sensor regions, each sensor region being configured to sense light and to generate a light detection signal proportional to the received light intensity independently of the other sensor regions;

and wherein a controller is configured to adjust an orientation of the receiver directivity axis (Ar), in order to centre a cross-sectional projection of the received beam associated with the optical communication signal onto a central common vertex (C) of the sensor regions.

8. The communication unit according to claim 7, further comprising an optical system for focussing an incoming beam associated with the optical communication signal onto the multi-region detector, and a further actuator configured to adjust a linear position of a focal point of the optical system along the receiver directivity axis (Ar) and relative to the multi-region detector;

and wherein the controller is configured to control the further actuator and adjust the linear position so that the incoming beam is projected out of focus onto the multi-region detector so as to cover all sensor regions.

9. The communication unit according to claim 1, wherein the main lobe of the optical signal detector and/or the optical signal generator corresponds to a fan beam distribution that is centred on the corresponding directivity axis (Ar, At) and is strongly bundled in an azimuth direction;

wherein the processor device is configured to determine an azimuth angle ($\Phi i$) for the received light signal relative to the housing;

and wherein the adjustment mechanism comprises a pan drive for adjusting an orientation of the fan beam distribution relative to the housing to substantially align the fan beam distribution with the determined azimuth angle ($\Phi i$).

10. The communication unit according to claim 1, wherein the optical signal detector and the optical signal generator are fixed relative to each other and form an integrated transceiver unit;

and wherein the adjustment mechanism comprises an actuator for simultaneously adjusting the main lobes and aligning the orientations of the directivity axes (Ar, At) with the at least one directional coordinate ($\Phi i$, $\Theta i$).

11. The communication unit according to claim 1, comprising a further light source configured to omnidirectionally emit at least one of an optical beacon signal and a further optical communication signal.

12. A method for using a communication unit with a housing and a communication transceiver according to claim 1, comprising:

deploying the communication unit and an underwater vehicle underwater, at non-coinciding positions and within optical communication range;

emitting an optical signal with the underwater vehicle;

determining at least one directional coordinate ($\Phi$, $\Theta$) for the received optical signal;

adjusting a directivity axis (Ar, At) of the optical signal detector and/or optical signal generator of the communication transceiver relative to the housing, to align the orientation of the directivity axis with the at least one directional coordinate;

establishing a wireless optical communication link between the communication transceiver of the unit and an communication transceiver of the underwater vehicle; followed by at least one of:

controlling the underwater vehicle via the communication unit and the established communication link, to let the underwater vehicle execute intervention or inspection operations;

transmitting data acquired by the communication unit via the established communication link to the underwater vehicle, and receiving, with the communication unit, data from the underwater vehicle, and streaming the received data with the communication unit to a remote control station.

13. The method according to claim 12, wherein the communication unit comprises an underwater imaging device, and wherein determining the at least one directional coordinate for the received optical signal comprises receiving the optical signal with the imaging device.

14. The method according to claim 13, wherein the data acquired by the communication unit is image data of the surroundings of the unit acquired by the imaging device.

15. The method according to claim 12, using a communication unit with a detector, wherein the detector forms a multi-region detector defining multiple sensor regions, each sensor region being configured to sense light and to generate a light detection signal proportional to the received light intensity independently of the other sensor regions;

and wherein a controller is configured to adjust an orientation of the receiver directivity axis (Ar), in order to centre a cross-sectional projection of the received beam associated with the optical communication signal onto a central common Vertex (C) of the sensor regions, the method comprising:

actuating the adjustment mechanism to adjust the orientation of the receiver directivity axis (Ar) in order to centre a cross-sectional projection of the received beam associated with the optical communication signal onto a central common vertex (C) of the sensor regions until light detection signal amplitudes from the sensor regions become substantially equal.

\* \* \* \* \*